May 1, 1923.
G. P. LAGEMANN
DRILL
Filed July 19, 1921
1,453,878
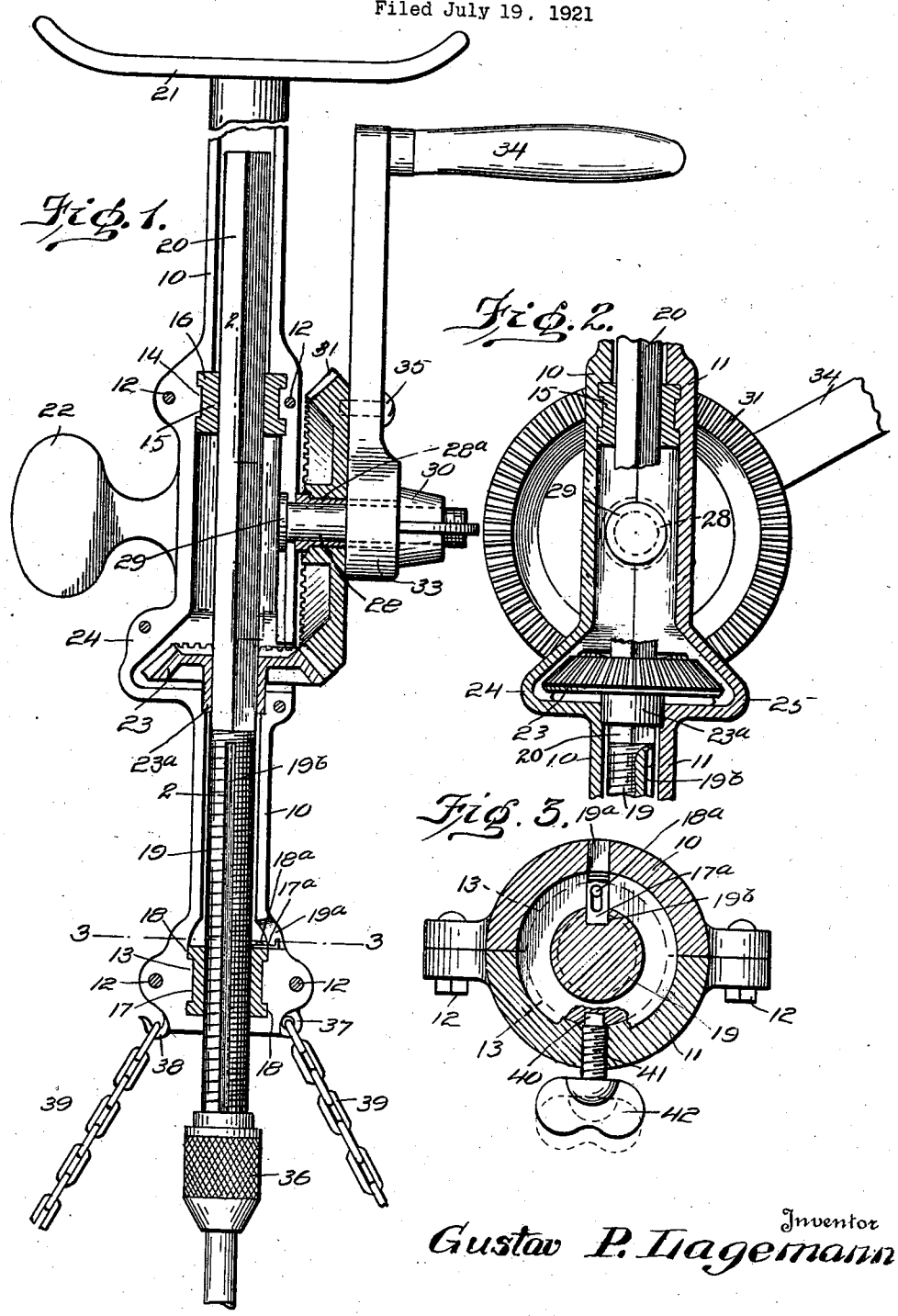
Inventor
Gustav P. Lagemann
By
Geo. P. Kimmel. Attorney Patented May 1, 1923.

1,453,878

UNITED STATES PATENT OFFICE.

GUSTAV P. LAGEMANN, OF LUVERNE, MINNESOTA.

DRILL.

Application filed July 19, 1921. Serial No. 485,854.

*To all whom it may concern:*

Be it known that I, GUSTAV P. LAGEMANN, a citizen of the United States, residing at Luverne, in the county of Rock and State of Minnesota, have invented certain new and useful Improvements in Drills, of which the following is a specification.

This invention relates to breast drills, and has for one of its objects to simplify and improve the construction and increase the efficiency and utility of devices of this character.

Another object of this invention is to produce a device of this character in which the parts are easily separable for renewal of broken or worn parts and without discarding the unworn or unbroken parts.

Another object of this invention is to produce a device of this character including a rotative and longitudinal movable stock or shank, and with means whereby the shank is free to rotate while held from longitudinal movement.

With these and other objects in view, the invention consists in certain novel features of construction as hereinafter shown and described and then specifically pointed out in the claims, and in the drawings illustrative of the preferred embodiment of the invention;—

Figure 1 is an elevation with one section of the divided casing or frame removed and parts shown in section.

Fig. 2 is a sectional detail illustrating the construction of the speed drive mechanism.

Fig. 3 is a transverse section enlarged on the line 3—3 of Fig. 1.

The improved implement comprises a supporting frame or casing divided longitudinally into two semi-tubular portions 10 and 11, united by clamp screws or bolts 12.

The frame sections are provided near their lower ends with co-acting half bearings, one of which is represented at 13, and with similar half bearings intermediate the ends, one of the latter being represented at 14. It will be understood that each of the frame sections is provided with the half bearings, as indicated by dotted lines in Fig. 3, so that when the frame sections are united complete circular bearings are produced.

Mounted for rotation in the coacting half bearings 14 is a guide collar 15 having annular ribs 16 to engage in corresponding annular half channels in the bearing, to hold the collar from movement longitudinally of the frame but leaving it free to rotate in the bearing. The collar 15 is formed with its bore irregular transversely, preferably square or other form than round.

Mounted for rotation in the coacting half bearings 13 is another and similar collar 17 except that its bore is threaded, and held from longitudinal movement in the frame by annular ribs 18.

The shank or stock of the implement comprises a threaded portion 19 and a transversely irregular portion 20, preferably square, the portion 20 corresponding to and slidably engaging the irregular bore of the collar 15 and the threaded portion 19 engaging the threads of the collar 17.

Mounted on one of the frame sections, for instance the section 10, is a breast plate 21, and attached to or formed integral with one of the frame sections, for instance the same section 10, is a hand grip 22.

A bevel gear 23 is mounted for rotation with the shank, said gear rotating adjacent a shoulder 23ª cast preferably integral with the frame or casing, which is enlarged as shown at 24 and 25 to "house" the gear.

A stud 28 is provided with a laterally enlarged head 29 and supported thereby in half bearings in the confronting faces of the casing sections 10 and 11.

The stud 28 when in position extends beyond the frame section being provided with a threaded outer end to receive a wing nut 30. The said nut bears against the outer end of a sleeve 28ª on the stud, said sleeve being formed with a shoulder so that when the nut bears against the sleeve it will clamp it against the metal of the casing and prevent the stud from rocking yet permitting free rotation of the gear thereon.

Mounted for rotation on the stud 28 is a bevel gear 31 in constant engagement with the gear 23.

Mounted on the stud 28 externally of the gear 31 is the hub portion 33 of a handle 34, the latter being attached to the rear face of the gear 31 as shown at 35.

The "chuck" portion of the improved implement may be of any improved form, and is represented conventionally at 36.

The frame section 10 is provided with an eye 37 at one side and an open hook 38 at the other side, to support a binding chain 39 by which the implement may be supported on the article being drilled.

The internally threaded collar 17 is provided with a socket 40 and the frame section 11 is provided with a set screw 41 adapted to be engaged in the socket and operative by a winged head 42, to lock the collar from rotation, when the stock is to be moved longitudinally of the frame sections by the coaction of its threads and the threads of the stock portion 19.

The collar 17 is also provided with a sliding latching member 17$^a$ formed with an elliptical slot therein to receive a pin 18$^a$ and movable in the groove 19$^b$ so that the collar may rotate with the stock 19 or the latching member may be moved into the recess 19$^a$ of the outer member 10 to be locked therewith and free of the stock.

If the drill is to be simultaneously rotated and fed longitudinally, the screw 41 is set into the nut 13 to hold the latter from rotation, and the clip 17$^a$ set free from the groove 19$^b$, as shown in Fig. 3, to permit the stock to be rotated.

If the stock is to be held from longitudinal movement and at the same time rotated, the set screw 41 is withdrawn and the clip 17$^a$ adjusted inwardly into the groove of 19$^b$, which thus locks the nut 13 to the stock so that it rotates with the threaded part of the stock.

By this arrangement the implement may be employed as a simple breast drill, or as a force feed drill, as required. The feed screw is of such a pitch as to move the drill forward a distance at each revolution to make the required depth of cut for the drill.

This invention is simple in construction, can be manufactured in various sizes and adapted for use in connection with various structures, and adapted for use wherever implements of this character are usually employed.

The preferred embodiment of the invention is disclosed in the drawings and set forth in the specifications, but it will be understood that any modifications within the scope of the claims may be made in the construction without departing from the principle of the invention or sacrificing any of its advantages.

What is claimed is:—

1. In an implement of the class described, a combined frame and casing having bearings arranged in spaced relation, a guide collar having an irregular bore of other form than round and mounted for rotation in one of said bearings, an internally threaded collar mounted for rotation in the other of said bearings, a stock member adapted to support a chuck device at one end and with a portion threaded to engage the threaded collar and another portion conforming to and slidable through the bore of the other collar, means supported by said casing for rotating said stock, means for locking said threaded bearing to the stock, and means for locking said threaded bearing to the casing.

2. In an implement of the class described, a combined frame and casing having bearings arranged in spaced relation, a guide collar having an irregular bore of other form than round and mounted for rotation in the other of said bearings, an internally threaded collar mounted for rotation in the other of said bearings, a stock member adapted to support a chuck device at one end and with a portion threaded to engage the threaded collar and another portion conforming to and slidable through the bore of the other collar, said stock having a channel directed longitudinally of the threaded portion, a set screw carried by the casing and adapted to engage the threaded collar, and a stop device movably engaging the threaded bearing and adapted to enter the longitudinal channel of the stock.

In testimony whereof, I affix my signature hereto.

GUSTAV P. LAGEMANN.